United States Patent [19]
Chang et al.

[11] Patent Number: 5,870,472
[45] Date of Patent: Feb. 9, 1999

[54] DYNAMIC RELOCATION OF THE SERVICE DATA CHANNEL

[75] Inventors: Kevin Chang, Neshanic Station, N.J.; Alfred W. Stufflet, Norristown, Pa.

[73] Assignee: General Instrument Corporation, Horsham, Pa.

[21] Appl. No.: 745,998

[22] Filed: Nov. 12, 1996

[51] Int. Cl.⁶ .............................. H04N 7/167; H04N 7/00
[52] U.S. Cl. ............................................. 380/20; 348/467
[58] Field of Search ................................ 380/20; 348/467

[56] References Cited

U.S. PATENT DOCUMENTS

| | | |
|---|---|---|
| 4,292,650 | 9/1981 | Hendrickson . |
| 4,378,570 | 3/1983 | Brokl . |
| 4,471,380 | 9/1984 | Mobley . |
| 4,553,161 | 11/1985 | Citta . |
| 4,554,579 | 11/1985 | Citta . |
| 4,712,239 | 12/1987 | Frezza et al. ............................. 380/20 |
| 5,130,793 | 7/1992 | Bordry et al. ........................... 358/86 |
| 5,136,411 | 8/1992 | Paik et al. ............................... 359/125 |
| 5,155,590 | 10/1992 | Beyers, II et al. ...................... 358/86 |
| 5,225,902 | 7/1993 | McCullan, Jr. .......................... 358/86 |
| 5,235,619 | 8/1993 | Beyers, II et al. ...................... 375/38 |
| 5,255,086 | 10/1993 | McMullan, Jr. et al. ................ 358/86 |
| 5,396,642 | 3/1995 | Blais et al. .............................. 455/1 |

Primary Examiner—Stephen C. Buczinski
Attorney, Agent, or Firm—Volpe and Koenig, P.C.

[57] ABSTRACT

A method and apparatus for preventing unauthorized descrambling of cable programming includes selective relocation of the service data channel within the vertical blanking interval thereby preventing unauthorized descrambling of programming by conventional descramblers.

19 Claims, 12 Drawing Sheets

DYNAMIC RELOCATION OF THE SERVICE DATA CHANNEL

BACKGROUND OF THE INVENTION

1. Field of the Invention

This invention relates to cable television descrambling systems. More particularly, the invention relates to a cable television system which relocates the service data channel to prevent unauthorized descrambling of premium and pay-per-view programs by unauthorized subscribers.

2. Description of Related Art

Scrambling and descrambling systems are widely used by CATV system operators to control subscriber access to premium and pay-per-view channels. Signals having video and audio content on certain channels are scrambled prior to transmission from the headend of the CATV system operator and are subsequently descrambled at the home of authorized subscribers. A device, commonly referred to as a descrambler or a settop terminal, is installed in a subscriber's home to restore the scrambled signals if the subscriber is authorized to receive the channel.

Many CATV settop terminals utilize a service data channel and a control data channel to determine whether a settop terminal is authorized to descramble a selected channel. A first authorization code is transmitted over the control data channel, which is dedicated to data transmission and is not associated with any broadcast channels. The control data channel originates at the headend of the CATV system and provides information specific to the CATV system such as data for the video programming guide, settop terminal addressable data and other control information such as the set of codes for the services which the settop terminal is authorized to receive.

The settop terminal separately receives a second authorization code which is transmitted over the service data channel for detection by the settop terminal. This authorized code is inserted by the CATV operator on line 18 of the vertical blanking interval (VBI), which is part of each frame of a video signal transmitted over a broadcast channel. The settop terminal compares the second authorization code sent over the service data channel with the first authorization code detected on the control data channel. If these two codes are identical, the settop terminal is authorized to begin descrambling the received signal.

The integrity of current systems using the aforementioned authorization scheme has been subverted. Illegal or "pirate" settop boxes may be configured to authorize descrambling of a channel regardless of the authorization code received on line 18 on the VBI. Additionally, if the control data channel is compromised, the settop terminal will authorize any code detected on line 18, thereby permitting illegal viewing of a program.

It would be desirable to have a system which prevents access to authorization codes and prohibits unauthorized descrambling of signals having video and audio program content.

SUMMARY OF THE INVENTION

A CATV system for preventing unauthorized descrambling of video and audio program signals comprises a headend for providing a plurality of scrambled video and audio program signals and a subscriber settop terminal for descrambling the signals. The headend provides a first authorization code over a separate control data channel and a second authorization code over a service data channel which is within the VBI of broadcast signals. The service data channel information is selectively located within the VBI. The settop terminal determines the location of the service data channel and authorizes the descrambling of signals having audio and video content based upon authorization codes transmitted over the service data channel and the control data channel.

Accordingly, it is an object of the present invention to provide a system which selectively relocates the service data channel within the vertical blanking interval to prevent unauthorized descrambling of signals having audio and video content.

Other objects and advantages will become apparent to those skilled in the art after reading the detailed description of a presently preferred embodiment.

DETAILED DESCRIPTION OF THE PREFERRED EMBODIMENT

The preferred embodiment will be described with reference to drawing figures wherein like numerals represent like elements throughout.

Figure 1:
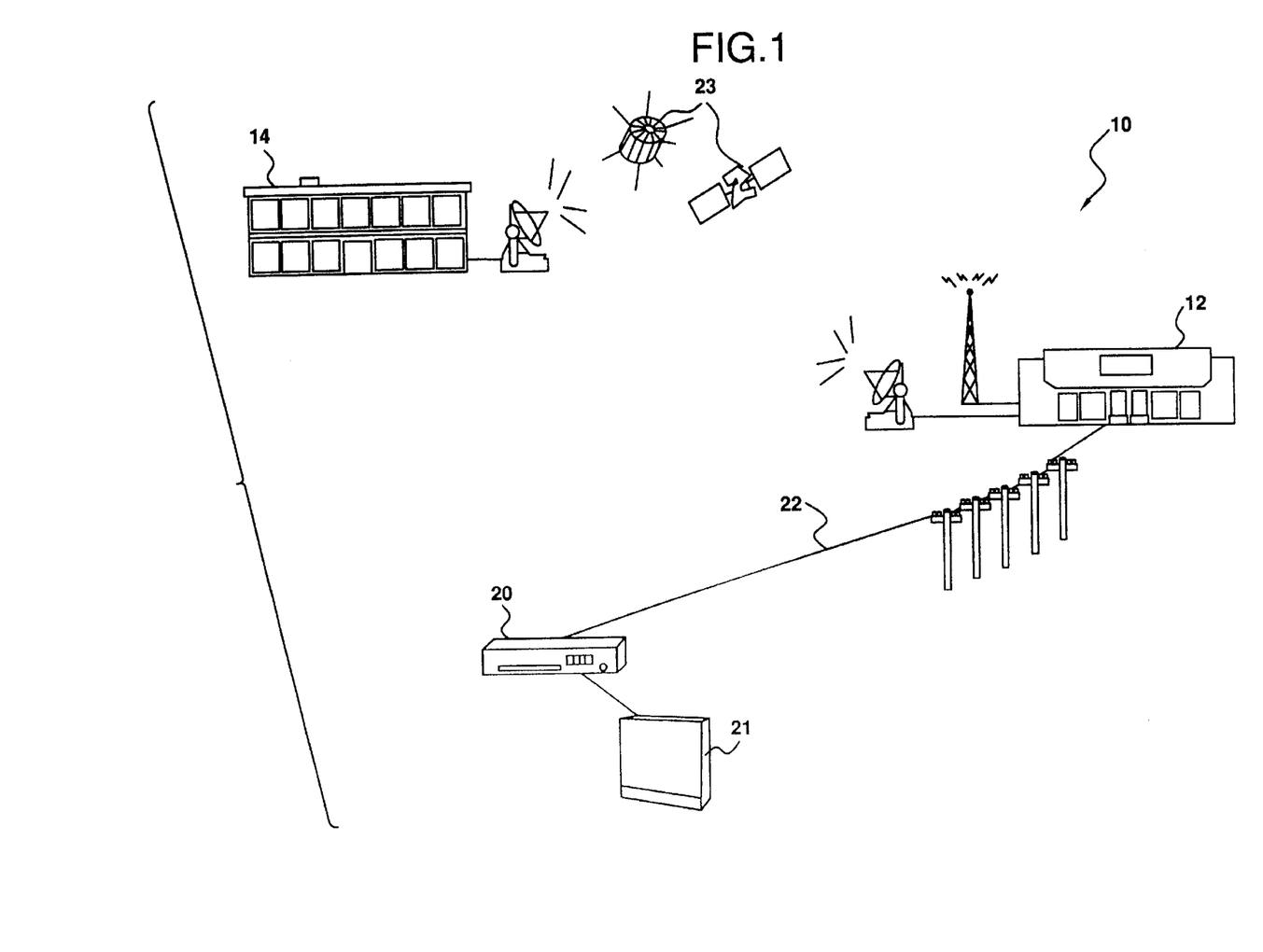
FIG. 1 is a simplified view of a CATV transmission infrastructure.

A CATV communication system 10 embodying the present invention is shown in FIG. 1. The communication system 10 generally comprises one or more video information providers 14 which communicate via satellite uplinks 23 with a plurality of headends 12. Each headend 12, in turn, communicates with a plurality of settop terminals 20, one or more of which are located in a subscriber's home. The settop terminal 20 receives the transmissions from the headend 12 through the CATV transmission network 22. The CATV transmission network 22 may comprise a standard coaxial network, a hybrid fiber-coax network or a "wireless cable" network employing microwave antennas and receivers. The settop terminal 20 provides the user interface between the subscriber's television 21 and the communication system 10.

Figure 2:
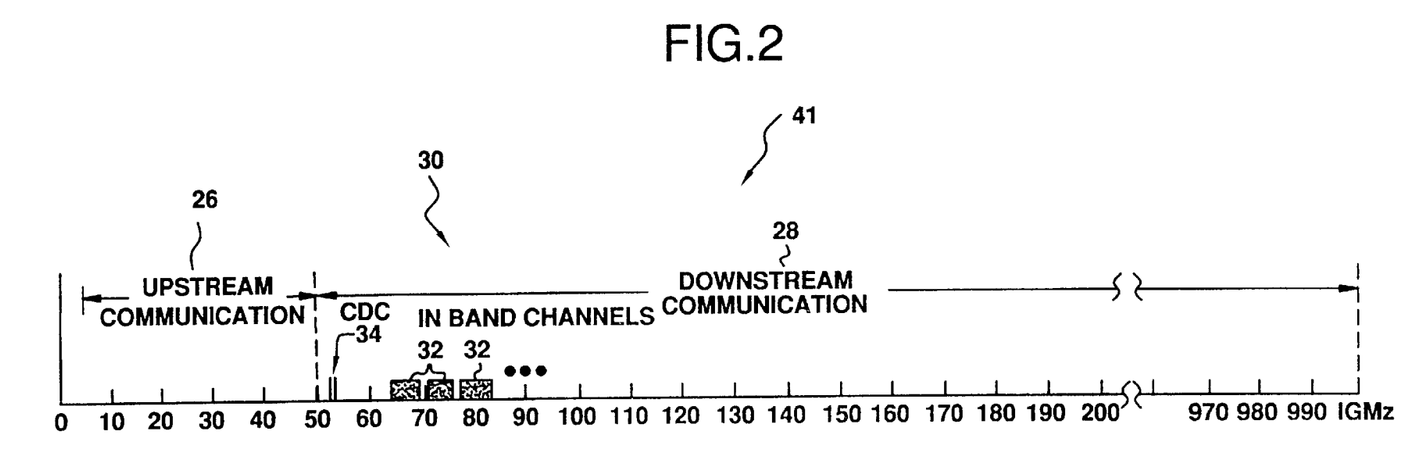
FIG. 2 is a plot of the upstream and downstream transmission spectrum.

As shown in FIG. 2, the transmission spectrum 41 typically extends up to 1 GHz. In order to provide a bi-directional communication flow over the cable transmission network 22 between the headend 12 and the settop terminals 20, the transmission spectrum 41 is divided into two paths. A downstream signal path originating at the headend 12 typically employs a downstream bandwidth 28 of frequencies above 50 MHz. An upstream path originating at the settop terminals 20 comprises an upstream bandwidth 26 of frequencies from 5 to 50 MHz. The downstream bandwidth 28 is further divided into 6 MHz broadcast channels 32 which are primarily used to transmit analog or digital video broadcasts and their associated analog or digital audio programs.

Figure 3:
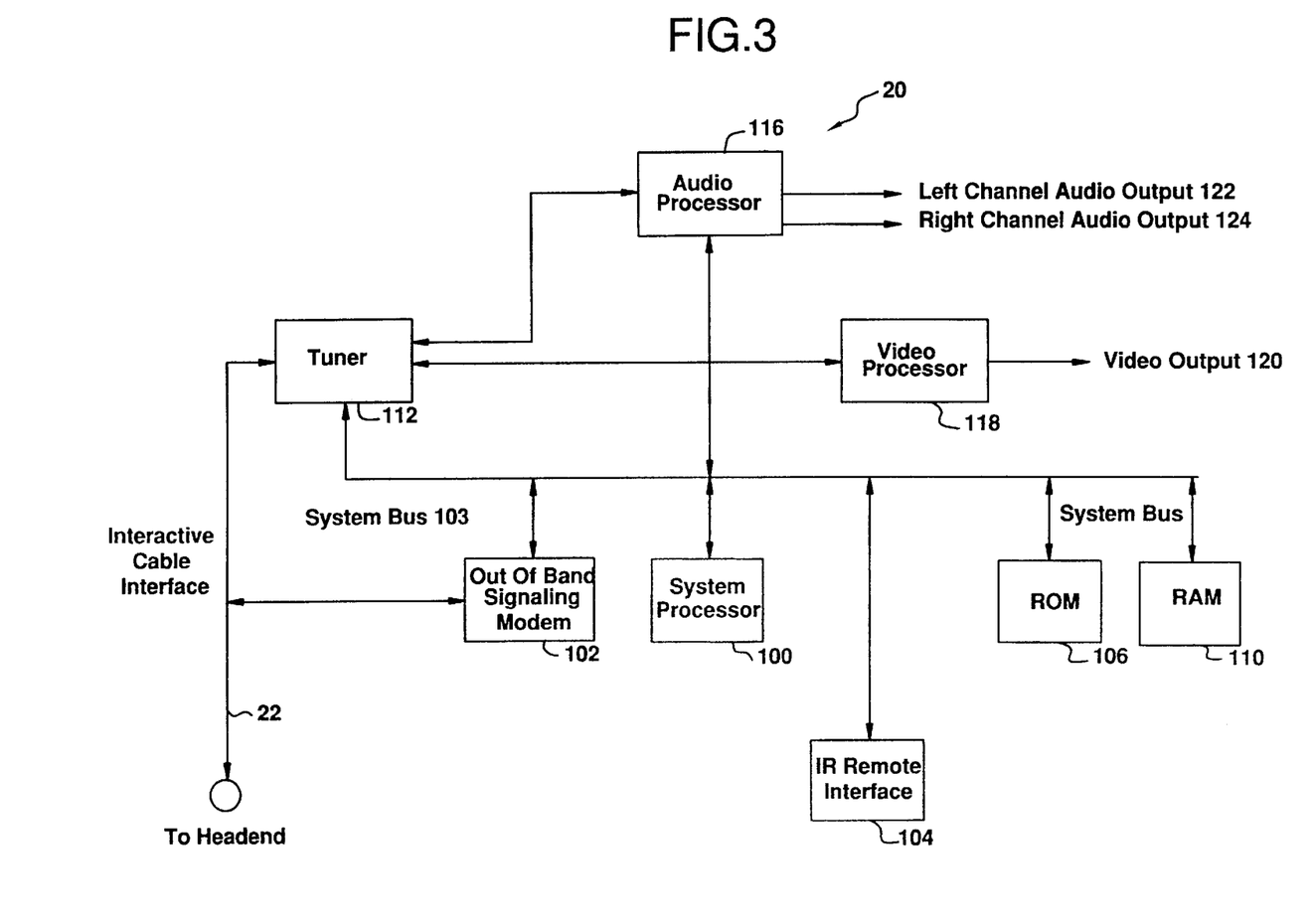
FIG. 3 is a block diagram of a settop terminal made in accordance with the present invention.

Referring to FIG. 3, a settop terminal 20 made in accordance with the present invention is shown. The settop terminal 20 includes a system processor 100, a tuner 112, a modem 102, video and audio processors 116, 118, memory 106, 110 and an infrared (IR) remote interface 104. A system bus 103 facilitates communications between components within the settop terminal 20.

The system processor 100 provides overall control of the settop terminal 20. The system processor 100 receives start up functions from the read only memory (ROM) 106 upon power-up and stores control information and other data sent from the headend 12 in the random access memory (RAM) 110, which is preferably nonvolatile. As will be explained in detail hereinafter, control information from the headend 12 includes authorization codes sent over the CDC and the service data channel which are stored in RAM 110.

The tuner 112 is responsive to the frequency of the channel selected by the consumer to remove the carrier signal. Audio and video content is processed through the audio processor 116 and the video processor 118 respectively in a manner which is well known to those skilled in the art. The baseband video signal is typically placed on a second carrier frequency corresponding to television channels 3 or 4 to provide a video output 120. Left and right channel audio inputs 122, 124 are also provided for input into a stereo (not shown) or the audio inputs of a consumer's television 21 if so equipped.

The modem 102 provides a data interface between the system processor 100 and the CATV headend 12. The modem 102 receives out-of-band data transmissions from the headend 12. Optionally, if bidirectional communication is desired, the modem 102 may transmit communications upstream from the settop terminal 20 to the headend 12. However, those skilled in the art should recognize that bi-directional communication is not required for the present invention.

The settop terminal 20 is controlled via the infrared (IR) remote control interface 104. The IR interface 104 comprises an IR signal emitter which sends IR control signals to the IR receiver located within the settop terminal 20. The received control signals are then forwarded to the system processor 100. Push-button controls located on the exterior of the settop terminal 20 may also be used to control the settop terminal 20.

The settop terminal 20 receives information from the headend 12 which includes in-band data within the VBI of programs transmitted over broadcast channels 32 and out-of-band information on a control data channel (CDC) 34. The system processor 100 controls the audio processor 116 and the video processor 118. The system processor 100, in conjunction with the audio processor 116 and the video processor 118, descrambles the baseband signal of the selected channel 32 if the subscriber is an authorized user as will be described in detail hereinafter. The audio and video processors 116, 118 process the in-band data from the selected channel 32 for receipt (viewing and listening) by the subscriber.

Each settop terminal 20 includes a unique digital identifier, such as a digital address, which permits the cable operator to send commands directly to an individual settop terminal 20. These commands are typically called addressable commands. The addressable commands are carried via an out-of-band addressable data stream, i.e. the CDC 34.

Figure 4:
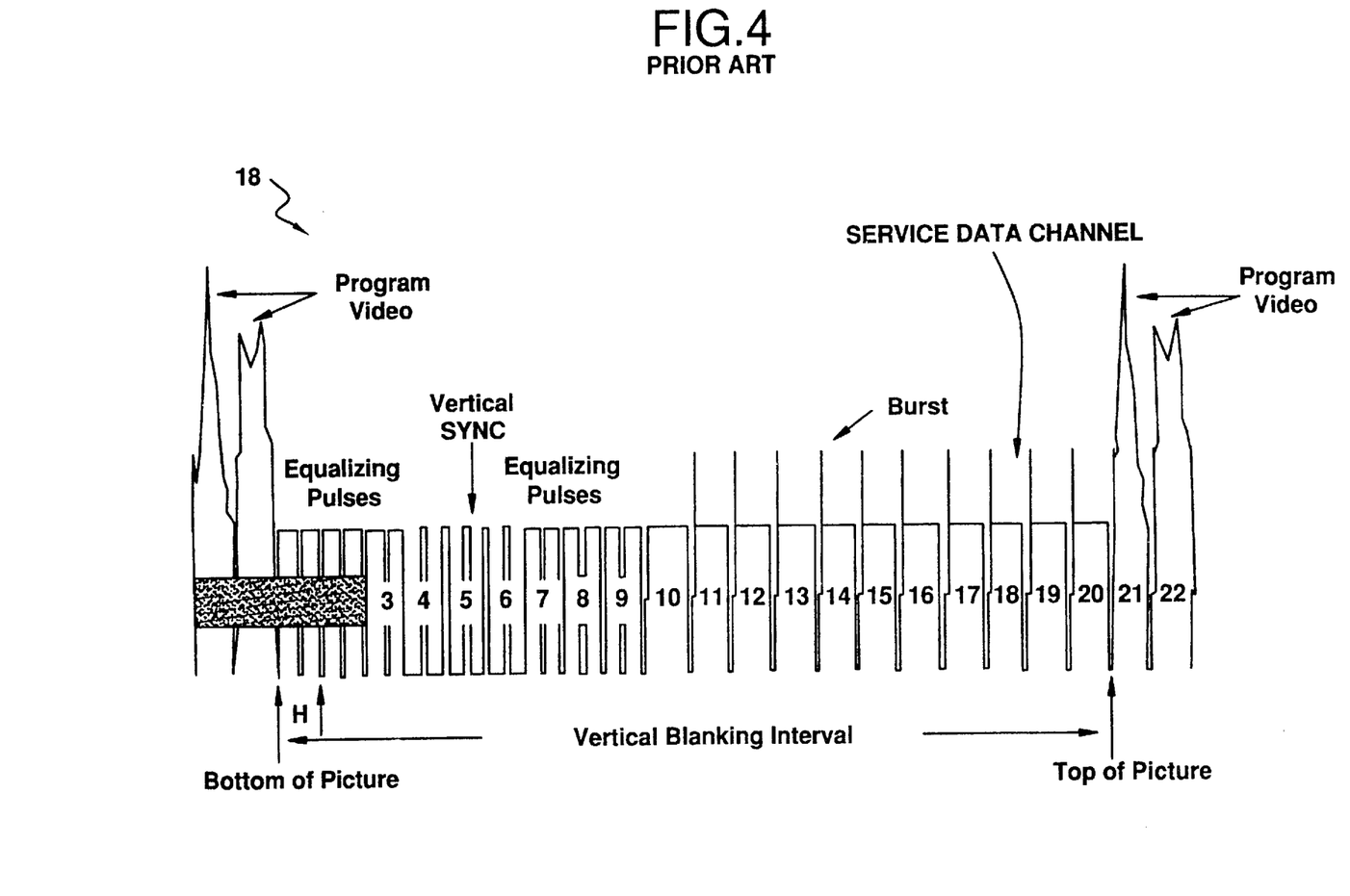
FIG. 4 is the prior art utilization of the VBI of a video frame.

Referring to FIG. 4, there is shown the prior art use of the VBI. Embedded within each video frame 18 sent over the broadcast channel 32 is specific information. The complete video picture, called a frame, is made up of two fields each containing 262½ horizontal scan lines. After each field of 262½ horizontal lines is scanned, the scanning beam returns to the top of the screen to begin scanning of the next field. The retrace time is called the VBI. During the vertical blanking interval, no program video information is included in the composite video signal. The VBI lasts for a time equal to 21 horizontal lines or 1333.5 $\mu$S and comprises a plurality of horizontal lines, each line containing up to 24 bits of information. The VBI may also include special reference signals that are located on selected lines of the VBI. Several common signals located along the VBI include the vertical interval test signal on lines 17 and 18, the vertical interval reference signal on line 19, and the closed caption signal on line 21.

Figure 5:
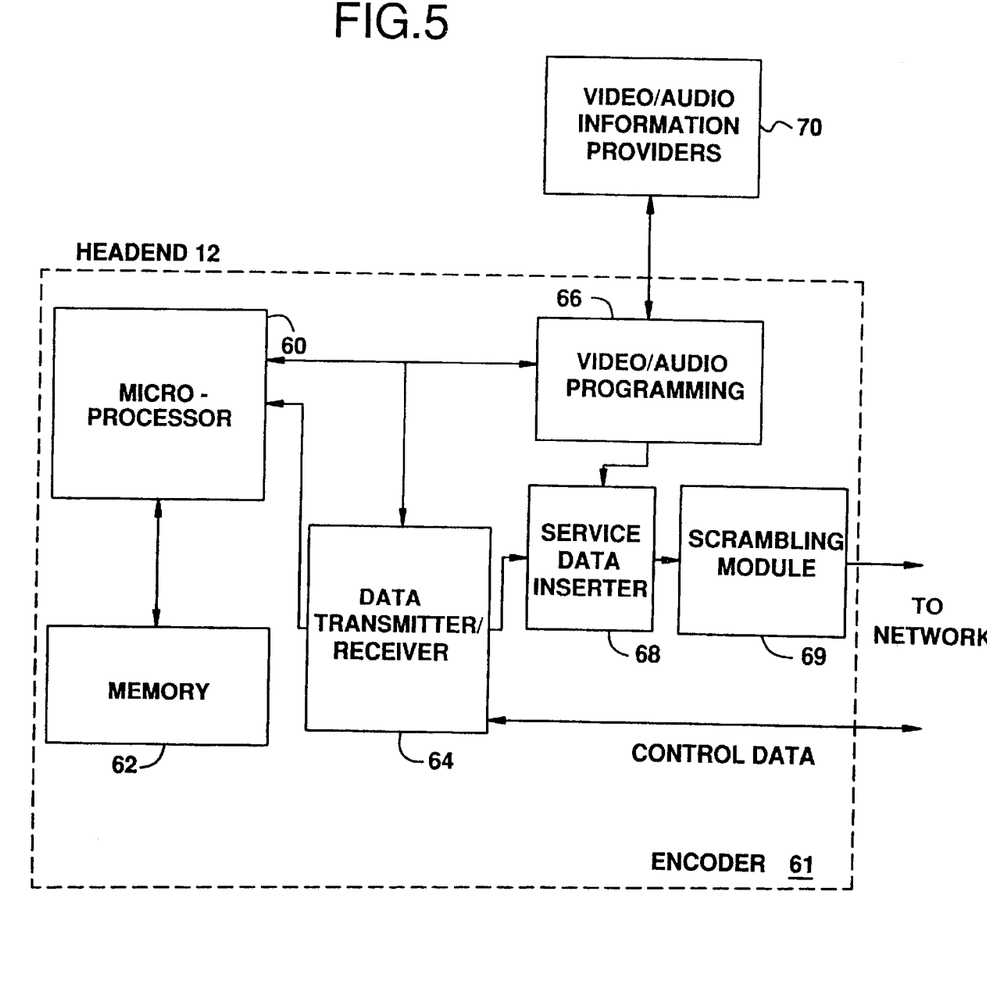
FIG. 5 is a block diagram of a headend made in accordance with the present invention.

Referring to FIG. 5, a headend 12 made in accordance with the teachings of the present invention is shown. The headend 12 receives video, audio and data content from remote service providers 70 and retransmits this information over the CATV transmission network 22 in a manner that is well known to those of skill in the art. The headend 12 may also be the origination source of local program content. The headend 12 includes an encoder 61 which comprises a microprocessor 60 which is coupled to an electronic storage device 62 such as a PC hard drive, or any other suitable type of memory, and a data transceiver 64. The data transceiver 64 is further coupled with a service data inserter 68 which combines the data with the video audio and data content 66 for transmission to consumers over the CATV network 22. The data transceiver 64 is also directly coupled with the CATV network 22 for transmitting and receiving control data. The service data channel information, and any other information inserted into the VBI of the video signal, is inserted by the service data channel inserter 68. Insertion is accomplished by using "on/off" keying at a color burst frequency as is well known by those of skill in the art. A scrambling module 69 scrambles the signals prior to transmission over the network 22.

Figure 6:
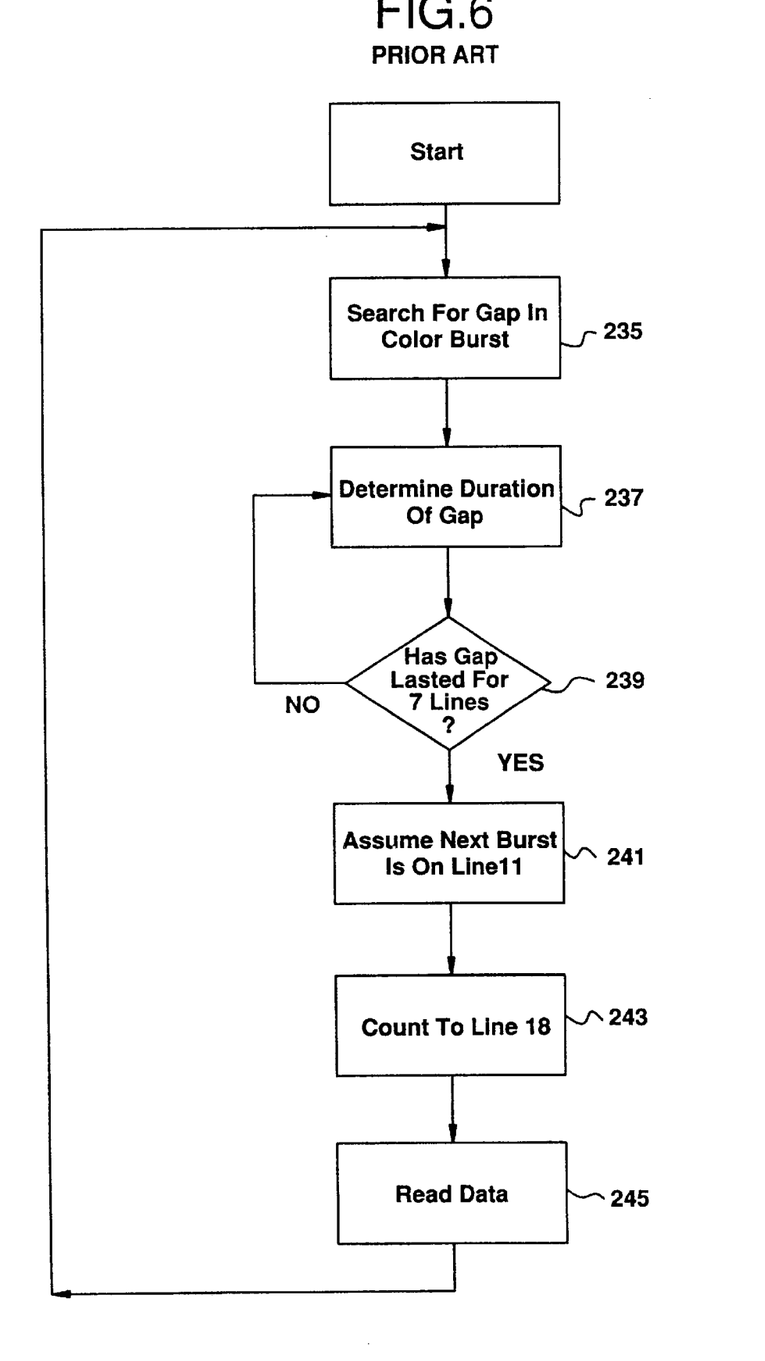
FIG. 6 is a flow diagram of a prior art method of reading information within line 18 of VBI of a video frame.

Referring to FIG. 6, in order to properly detect the location of the service data channel within the VBI, many settop terminals currently search for an absence of color burst, or a gap, which indicates the occurrence of the VBI (step 235). This gap occurs during the stages of equalizing and synchronizing pulses on the VBI. These pulses synchronize the scanning of the television's electron beam with the incoming composite video signal to stabilize the video image on the screen.

Once the color burst gap is detected, the position of the service data channel and associated authorization codes in the VBI can be determined. The duration of the gap is counted (step 237), and if the gap duration is at least seven lines (step 239) it is assumed that the next burst is on line 11

(step 241). This provides a timing pulse for detection of service data channel information on line 18. The signal is synchronized to line 11 which activates a counter to count to line 18 (step 243). The control data channel information on line 18 is then read (step 245). Once the data is read (step 245) the process is repeated. Typically, in pirate settop terminals, the control data channel is compromised so that if any service codes are read on line 18 of the VBI, the settop terminal is automatically authorized to begin descrambling. This permits unauthorized reception and viewing of scrambled programs.

Figure 7:
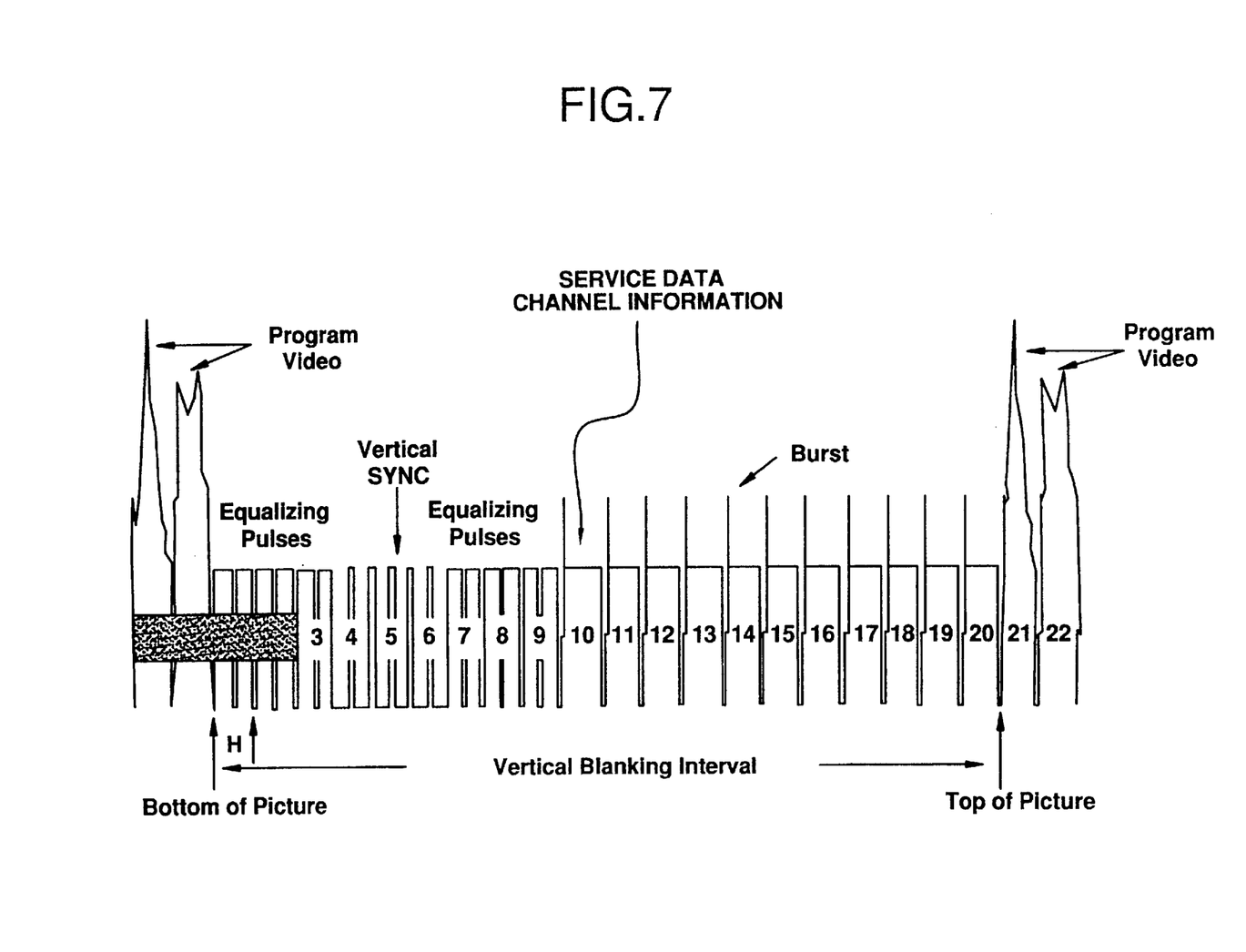
FIG. 7 is a flow diagram of the method of relocating the service data channel according to the present invention.

Referring to FIG. 7, in the preferred embodiment of the present invention the service data channel information is located on line 10 of the VBI. Pirate settop terminals looking on line 18 of the VBI for the service data channel and the associated authorization codes will not detect any codes, since these codes are now located on line 10 of the VBI. As a result, line 18 will be interpreted as being part of a non-scrambled video signal. Accordingly, the settop terminal 20 will not descramble the signal and will build a scrambled picture on the television screen.

Figure 8:
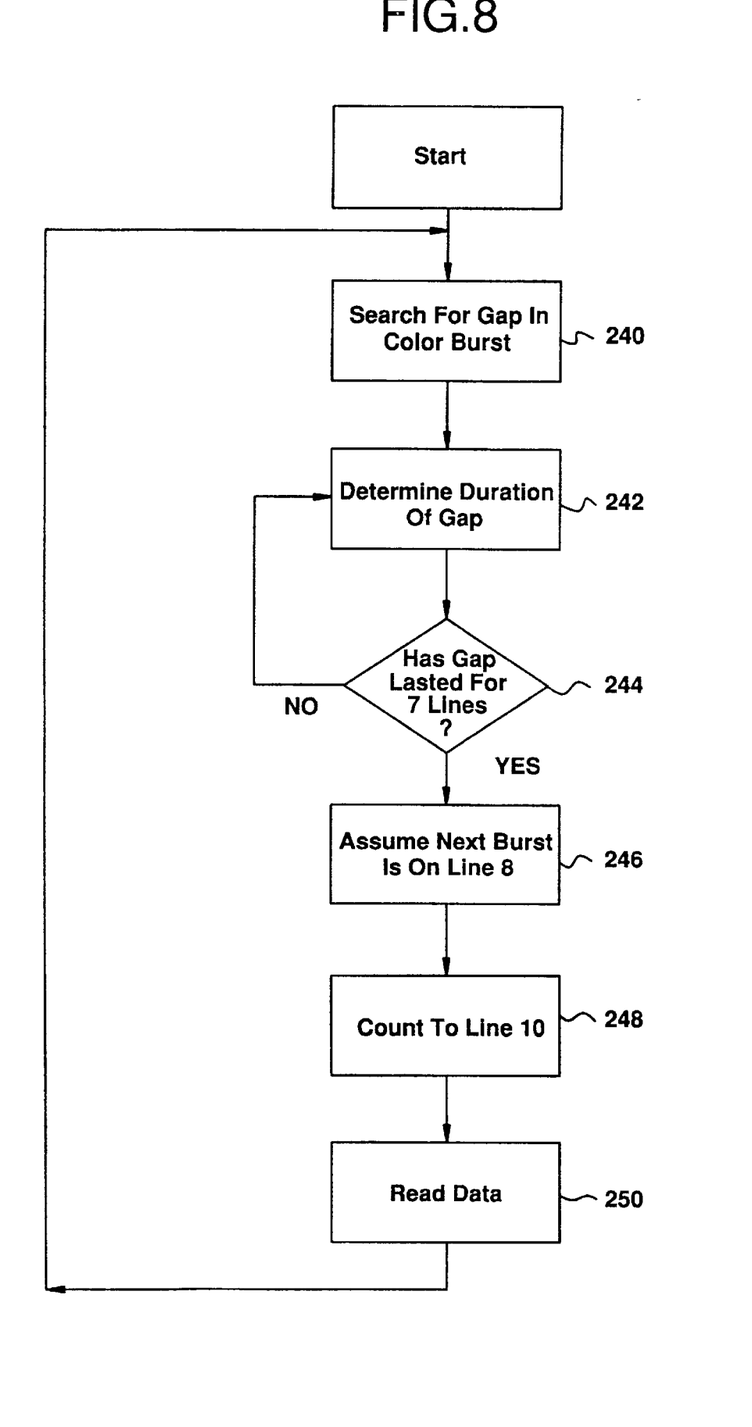
FIG. 8 is a flow diagram of the method of detecting the service data channel information within the VBI.

As shown more clearly in FIG. 8, detection of the service data channel is initiated by looking for an absence of color burst, as described earlier herein (step 240). Once the gap is detected (step 240) the duration of the gap is determined (step 242). If the duration of the detected gap is at least 7 lines (step 244) it is assumed that the next burst is on line 8 (step 246), as shown in FIG. 7. The signal is synchronized to line 8 which activates a counter to count to line 10 (step 248). The service data channel authorization codes on line 10 are then read (step 250). Once the data is read (step 250) the process is repeated.

Figure 9:
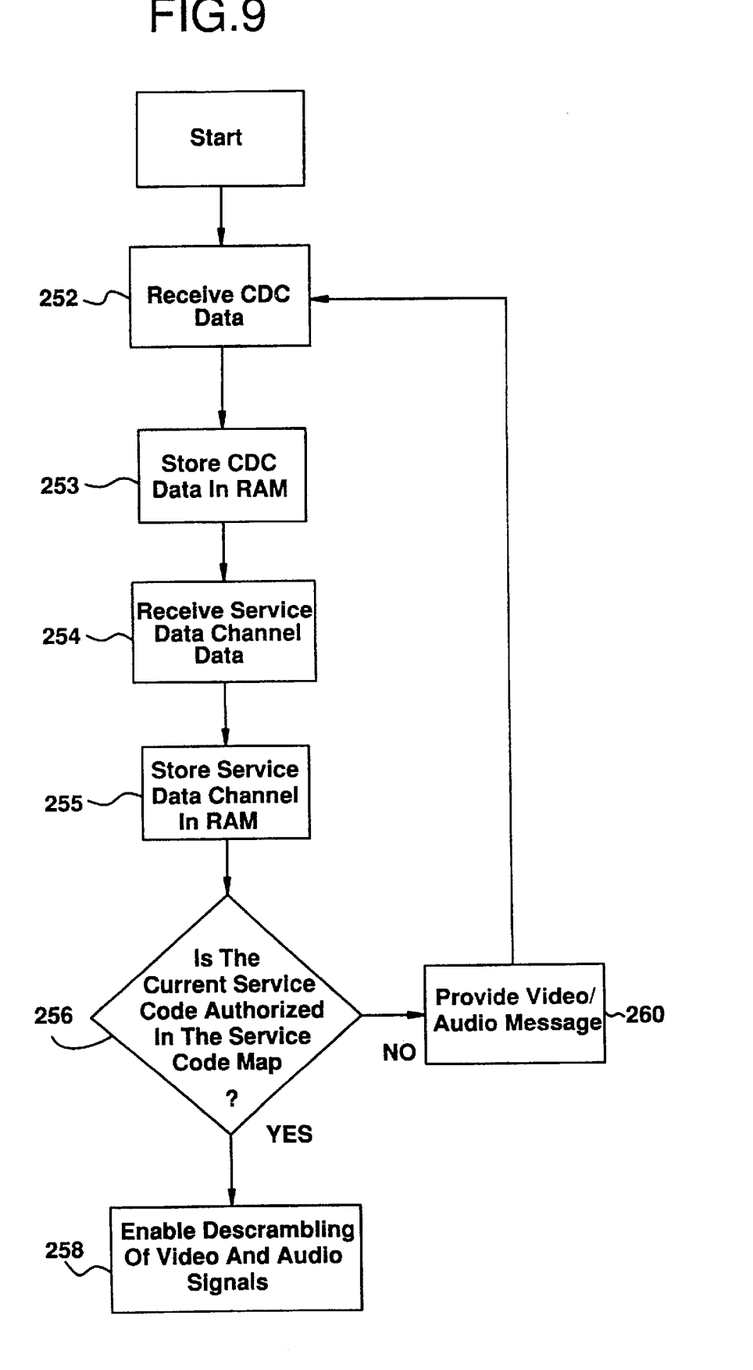
FIG. 9 is a flow diagram of a method for determining whether descrambling of the video signal should be performed.

Referring to FIG. 9, as the CDC data is received by the settop terminal 20 (step 252), the system processor 100 loads the data into selected registers in RAM 110 (step 253). Likewise, as the settop terminal 20 receives the service data channel data (step 254) it is loaded into selected registers in RAM 110 (step 255). The contents of these registers are then compared (step 256). If the content of the service data register matches the content of the control data register for the particular service being requested, scrambled programs which the subscriber is authorized to receive are descrambled for viewing, (step 258). If the contents of the two registers do not match, the descrambling will not be performed. If desired, the system processor 100 may forward a video and/or audio message to the subscriber explaining the reason why descrambling was not enabled and providing the subscriber with instructions for enabling descrambling (step 260), (i.e., by paying the CATV operator for the service).

In addition to authorization information, the service data channel may also include scramble mode information. Upon a positive match between the service data channel and control data channel, the system processor 100 reads the remaining service data channel information to determine which scramble mode to use. It should be understood by those of skill in the art that there are many types of descrambling methods that are currently used. A detailed description of the variety of descrambling methods is outside the scope of the present invention.

Figure 10:
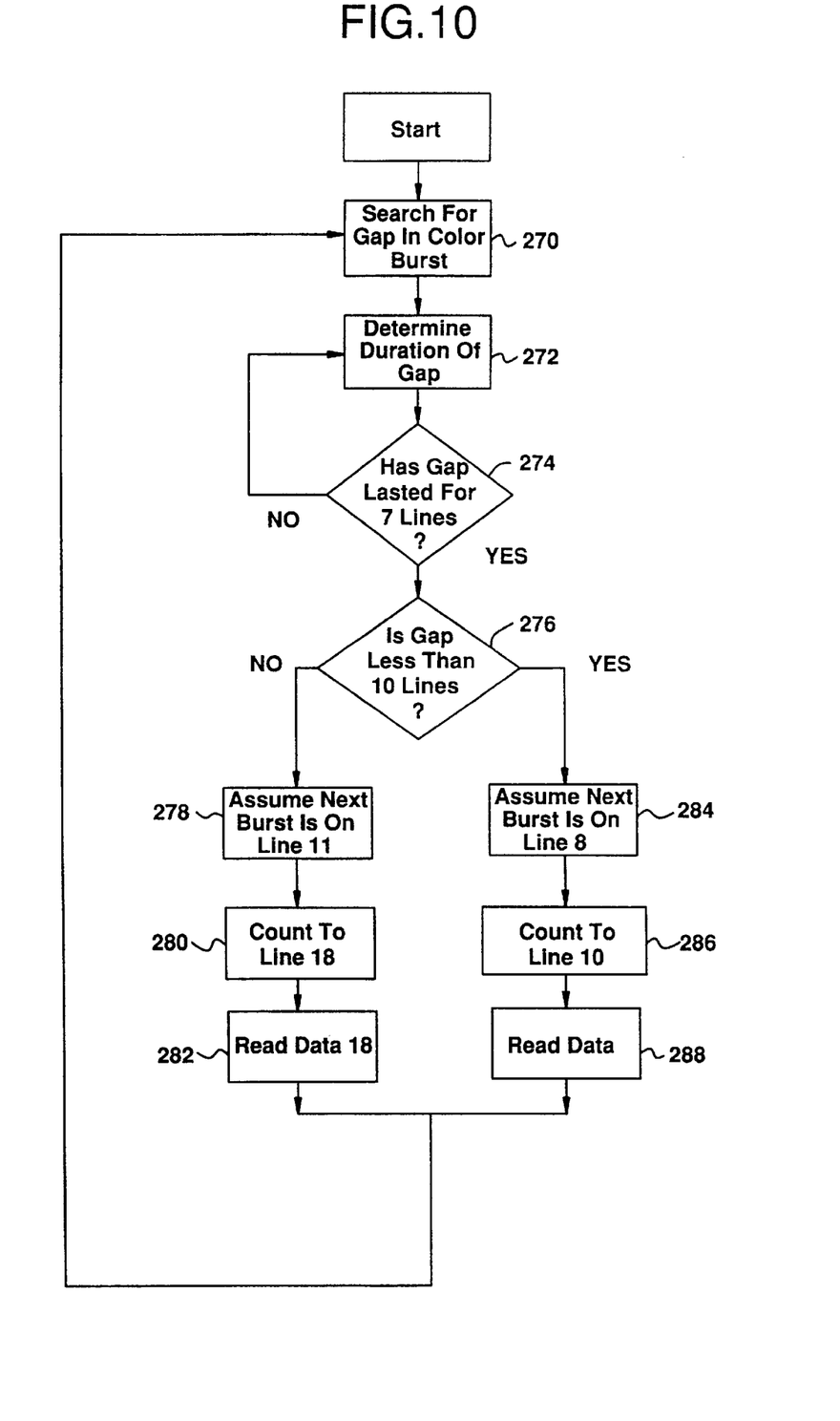
FIG. 10 is a flow diagram of an alternative embodiment of the present invention incorporating a dynamically relocatable service data channel.

In an alternative embodiment, shown in FIG. 10, the system dynamically switches the location of the service data channel within the VBI between lines 10 and 18. Pirate settop terminals searching for the service data channel on a specific line of the VBI will be unable to locate the authorization code. In this embodiment, the burst is dynamically moved from line 18 to a different line of the VBI, for example, line 10. The system processor 100 searches for a gap in the color burst from the last horizontal scan line in the video frame to the next burst (step 270) and counts the duration of the gap (step 272). Once it has been determined that the gap lasts longer than seven lines (step 274) the system processor 100 determines whether the gap is greater or less than ten lines (step 276). If the gap is less than ten lines, the system processor 100 assumes that the burst is on line 8 (step 284). The system processor 100 then counts to line 10 (step 286) and reads the service data channel information on line 10 (step 288). If the gap is greater than ten lines, the system processor 100 assumes the next burst is on line 11 (step 278). The system processor 100 then counts to line 18 (step 280) and reads the service data channel information on line 18 (step 282). After the data is read (steps 282, 288) the process is repeated. In this manner, the system processor 100 periodically determines the appropriate line within the VBI for which to look for service data channel information.

Figure 11:
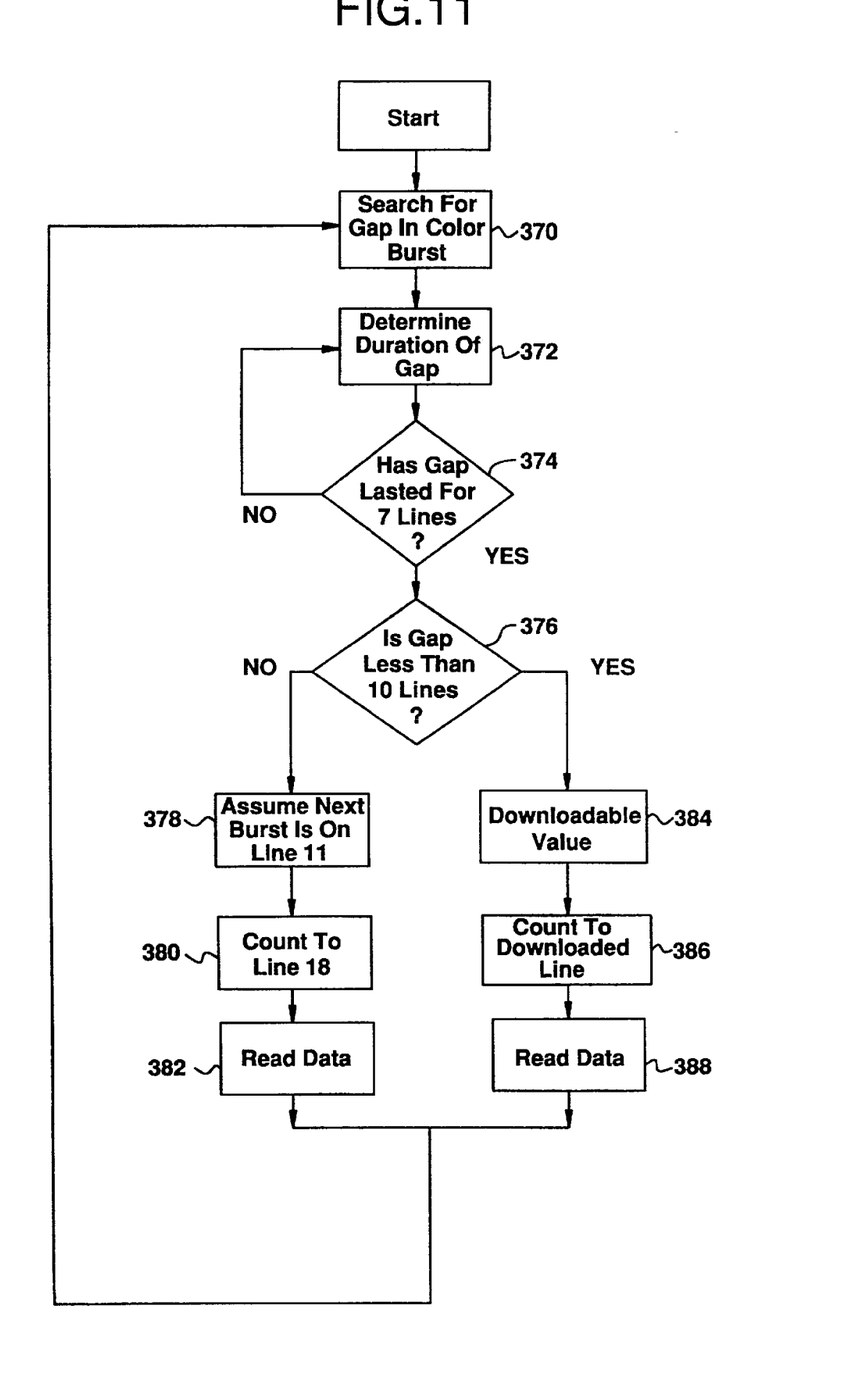
FIG. 11 is a flow diagram of a second alternative embodiment of the present invention incorporating a dynamically relocatable service data channel.

In a second alternative embodiment, the specific line number within the VBI to be used as the service data channel may be downloaded through the CDC to the settop terminal. As a result, the system may dynamically switch the location of the service data channel based on parameters downloaded over the CDC. This embodiment is shown in FIG. 11. In this embodiment, the burst is dynamically moved from line 11 to a different line of the VBI as specified by the value downloaded over the CDC. The system processor 100 searches for a gap in the color burst from the last horizontal scan line in the video frame to the next burst (step 370) and counts the duration of the gap (step 372). Once it has been determined that the gap lasts longer than seven lines (step 374) the system processor 100 determines whether the gap is greater or less than ten lines (step 376). If the gap is less than ten lines, the system processor 100 loads the value previously sent via the CDC that will be used to determine which VBI line is used (step 384). The system processor 100 then counts to the specified line (step 386) and reads the service data channel information on that line (step 388). If the gap is greater than ten lines, the system processor 100 assumes the next burst is on line 11 (step 378). The system processor 100 then counts to line 18 (step 380) and reads the service data channel information on line 18 (step 382). Once the data is read, the process is repeated.

Figure 12:
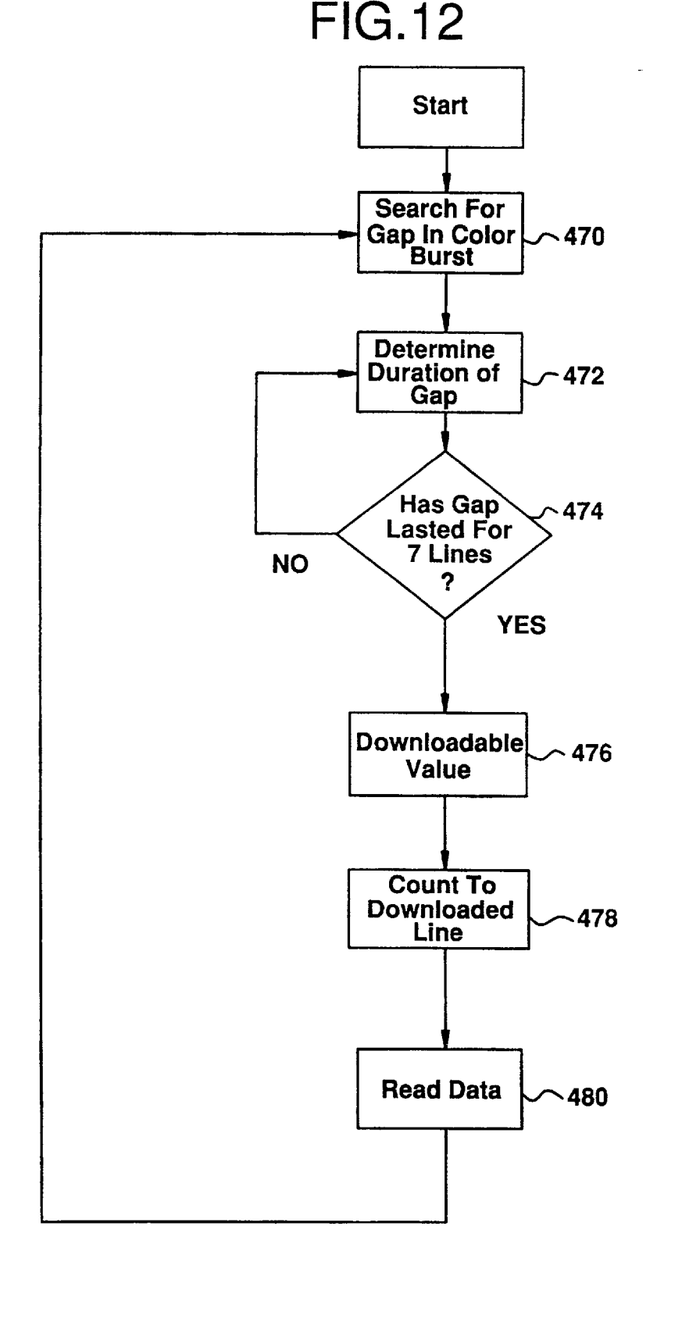
FIG. 12 is a flow diagram of a third alternative embodiment of the present invention incorporating a dynamically relocatable service data channel.

In a third alternative embodiment, the specific line number within the VBI to be used as the service data channel may be downloaded through the CDC to the settop terminal. As a result, the system may dynamically switch the location of the service data channel based on parameters downloaded over the CDC. This embodiment is shown in FIG. 12. The headend dynamically switches the location of the service data channel within the VBI and downloads this location over the CDC. The system processor 100 searches for a gap in the color burst from the last horizontal scan line in the video frame to the next burst (step 470) and counts the duration of the gap (step 472). Once it has been determined that the gap lasts longer than seven lines (step 474), the system processor 100 loads the value previously sent via the CDC that will be used to determine which VBI line is used (step 476). The system processor 100 then counts to the specified line (step 478) and reads the service data channel information on that line (step 480). Once the data is read, the process is repeated.

Although the invention has been described in part by making detailed reference to certain specific embodiments, such details is intended to be instructive rather than restrictive. It will be appreciated by those skilled in the art that many variations may be made in the structure and mode of operation without departing from the spirit and scope of the invention as disclosed in the teachings herein.

What is claimed is:

1. A system for preventing unauthorized descrambling of scrambled programming signals which are transmitted over a CATV communication network which includes a headend and a plurality of settop terminals, the system comprising:

a headend comprising:

means for selecting a vertical blanking interval (VBI) line for inserting authorization data within a programming signal;

means for inserting said authorization data within said VBI line; and means for transmitting a location signal relating to said selected VBI line; and a settop terminal comprising:

means for receiving said location signal;

means for determining said selected VBI line based upon said location signal; and means for receiving said authorization data from within said selected VBI line to thereby enable descrambling of said scrambled programming signal.

2. The system of claim 1 wherein said determining means comprises:

means for searching for a gap in the color burst within said VBI;

means for measuring the duration of said gap;

means for detecting said location signal; and means for counting a predetermined number of VBI lines from said detected location signal until said selected VBI line is reached.

3. The system of claim 2 wherein said headend further comprises means for communicating a service code map to said settop terminal.

4. The system of claim 3 wherein said settop terminal further comprises means for receiving said communicated service code map.

5. The system of claim 4 wherein said authorization data comprises a service code authorization and wherein said enabling means comprises:

means for comparing said service code authorization to said service code map to thereby enable descrambling of said scrambled program signals if said service code authorization is within said service code map.

6. The system of claim 5 wherein said settop terminal further comprises means for storing said service code authorization and said service code map.

7. The system of claim 1 wherein said location signal contains the specific address of said selected VBI line and said determining means comprises:

means for receiving said address; and means for accessing said selected VBI line.

8. The system of claim 1 wherein said selecting means alternatively selects VBI lines 18 and 10.

9. The system of claim 1 wherein said location signal comprises a burst within the equalization and synchronization stages of the VBI.

10. A headend for use in a system for preventing unauthorized descrambling of scrambled programming signals which are transmitted over a CATV communication network which includes a plurality of settop terminals; each settop terminal comprising means for receiving a location signal from said headend relating to the location of a selected vertical blanking interval (VBI) line, means for determining the selected VBI line within a programming signal based upon said location signal, and means for receiving authorization data from within said selected VBI line to thereby enable descrambling of said scrambled programming signal; the headend comprising:

means for selecting said VBI line for inserting said authorization data within the programming signal;

means for inserting said authorization data within said VBI line; and means for transmitting a location signal relating to said VBI line.

11. The headend of claim 10 further comprising means for communicating a service code map to said plurality of settop terminals.

12. The headend of claim 11 wherein said transmitting means comprises means for generating a pulse and inserting said pulse within the equalization and synchronization stages of the VBI as said location signal.

13. The headend of claim 11 further comprising means, responsive to said selecting means, for generating an address wherein said address comprises said location signal.

14. A settop terminal for use in a system for preventing unauthorized descrambling of scrambled programming signals which are transmitted over a CATV communication network which includes a headend and a plurality of settop terminals; the headend comprising means for selecting a vertical blanking interval (VBI) line for inserting authorization data within a programming signal; means for inserting said authorization data within said VBI line; and means for transmitting a location signal relating to the location of said selected VBI line; the settop terminal comprising:

means for receiving said location signal;

means for determining said selected VBI line based upon said location signal; and means for receiving said authorization data from within said selected VBI line to thereby enable descrambling of said scrambled programming signal.

15. The settop terminal of claim 14 wherein said determining means comprises:

means for searching for a gap in the color burst within the VBI;

means for measuring the duration of said gap;

means for detecting said location signal; and means for counting a predetermined number of VBI lines from said detected location signal until said selected VBI line is reached.

16. The settop terminal of claim 15 wherein said headend further comprises means for communicating a service code map to said settop terminal and said settop terminal further comprises means for receiving said communicated service code map.

17. The settop terminal of claim 16 wherein said authorization data comprises a service code authorization and wherein said enabling means comprises means for comparing said service code authorization to said service code map to thereby enable descrambling of said scrambled program signals if said service code authorization is within said service code map.

18. The settop terminal of claim 17 further comprising means for storing said service code authorization and said service code map.

19. The settop terminal of claim 14 wherein said location signal comprises the specific address of said selected VBI line and said determining means comprises means for receiving said address and means for accessing said selected VBI line.

* * * * *